United States Patent
Yamamoto

(10) Patent No.: US 10,559,071 B2
(45) Date of Patent: Feb. 11, 2020

(54) IMAGE PROCESSING APPARATUS AND NON-TRANSITORY COMPUTER READABLE MEDIUM

(71) Applicant: FUJI XEROX CO., LTD., Tokyo (JP)

(72) Inventor: Takayuki Yamamoto, Kanagawa (JP)

(73) Assignee: FUJI XEROX CO., LTD., Tokyo (JP)

(*) Notice: Subject to any disclaimer, the term of this patent is extended or adjusted under 35 U.S.C. 154(b) by 191 days.

(21) Appl. No.: 15/787,955

(22) Filed: Oct. 19, 2017

(65) Prior Publication Data
US 2018/0197279 A1 Jul. 12, 2018

(30) Foreign Application Priority Data

Jan. 11, 2017 (JP) ................. 2017-002666

(51) Int. Cl.
*G06T 5/00* (2006.01)
*G06T 9/00* (2006.01)

(52) U.S. Cl.
CPC ............. *G06T 5/008* (2013.01); *G06T 5/002* (2013.01); *G06T 9/00* (2013.01); *G06T 2207/20192* (2013.01); *G06T 2207/20208* (2013.01); *G06T 2207/20221* (2013.01)

(58) Field of Classification Search
CPC G06T 5/008; G06T 5/50; G06T 5/002; G06T 9/00; G06T 2207/20221; G06T 2207/20208; G06T 2207/20192
See application file for complete search history.

(56) References Cited

U.S. PATENT DOCUMENTS

| | | | |
|---|---|---|---|
| 7,382,403 B2 | 6/2008 | Sakamoto | |
| 7,605,821 B1* | 10/2009 | Georgiev | G06T 11/001 345/552 |
| 8,380,005 B1* | 2/2013 | Jonsson | G06T 11/60 382/282 |
| 2007/0013813 A1* | 1/2007 | Sun | G06T 7/12 348/587 |
| 2008/0198175 A1* | 8/2008 | Sun | H04N 1/3876 345/629 |

FOREIGN PATENT DOCUMENTS

| | | |
|---|---|---|
| JP | 4004943 B2 | 11/2007 |
| JP | 4316571 B2 | 8/2009 |
| WO | 2004/077347 A2 | 9/2004 |

OTHER PUBLICATIONS

Fattal et al., Gradient High Dynamic Range Compression, Jul. 2002, Siggraph 02, vol. 21 issue 3.*
Zeev Farbman et al., "Coordinates for Instant Image Cloning", Aug. 3-7, 2009, Proceeding SIGGRAPH '09 ACM, Article No. 67, New Orleans, Louisiana—Aug. 3-7, 2009, ACM New York, NY, USA c2009.
Patrick Perez et al., "Poisson Image Editing", Proc.SIGGRAPH, 2003, pp. 313-318, vol. 22, No. 3.

* cited by examiner

*Primary Examiner* — John B Strege
(74) *Attorney, Agent, or Firm* — Sughrue Mion, PLLC

(57) ABSTRACT

An image processing apparatus includes a correcting unit and a pasting unit. The correcting unit corrects a dynamic range of a second image in accordance with pixel information of a region. The second image is pasted on a first image serving as a destination for pasting. The region is in the first image and is to be in contact with the second image. The pasting unit pastes the second image on the first image after the correction of the dynamic range. The second image has pixel information. The pixel information is corrected in such a manner that a boundary with the first image is inconspicuously viewed.

10 Claims, 10 Drawing Sheets

FIG. 10

|  | $f_q$ |  |
|---|---|---|
| $f_q$ | p ($f_p$) | $f_q$ |
|  | $f_q$ |  |

_US 10,559,071 B2_

IMAGE PROCESSING APPARATUS AND NON-TRANSITORY COMPUTER READABLE MEDIUM

CROSS-REFERENCE TO RELATED APPLICATIONS

This application is based on and claims priority under 35 USC 119 from Japanese Patent Application No. 2017-002666 filed Jan. 11, 2017.

BACKGROUND

Technical Field

The present invention relates to an image processing apparatus and a non-transitory computer readable medium.

SUMMARY

According to an aspect of the invention, there is provided an image processing apparatus including a correcting unit and a pasting unit. The correcting unit corrects a dynamic range of a second image in accordance with pixel information of a region. The second image is pasted on a first image serving as a destination for pasting. The region is in the first image and is to be in contact with the second image. The pasting unit pastes the second image on the first image after the correction of the dynamic range. The second image has pixel information. The pixel information is corrected in such a manner that a boundary with the first image is inconspicuously viewed.

BRIEF DESCRIPTION OF THE DRAWINGS

Exemplary embodiments of the present invention will be described in detail based on the following figures, wherein:

FIG. 10 is a diagram for describing the positional relationship between a position and nearby images.

DETAILED DESCRIPTION

By referring to the attached drawings, an exemplary embodiment of the present invention will be described in detail below.

The Configuration of an Image Processing Apparatus

By referring to the attached drawings, an exemplary embodiment of the present invention will be described below.

Figure 1:
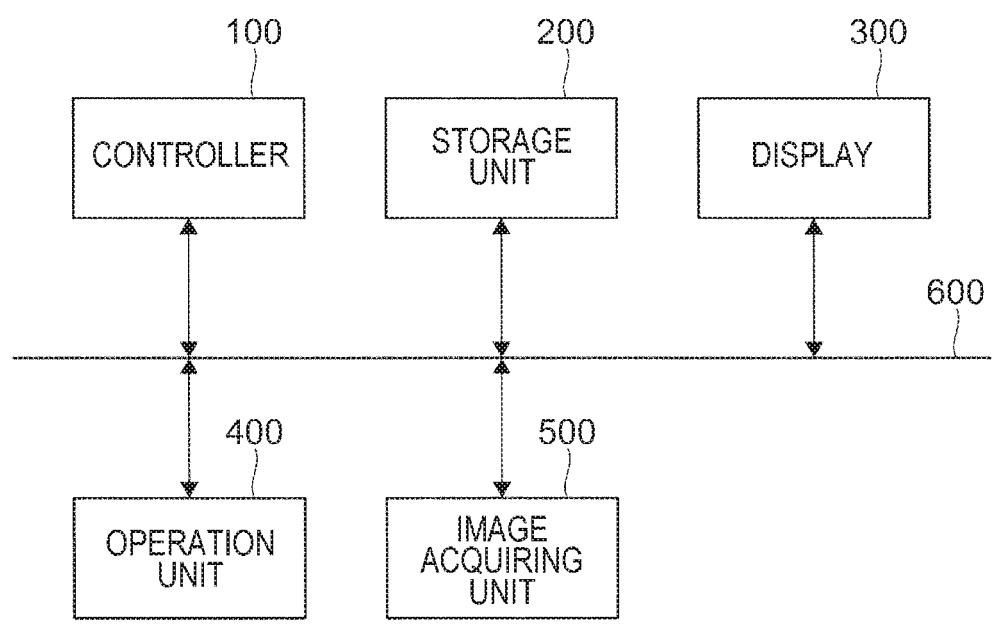
FIG. 1 is a block diagram illustrating an exemplary hardware configuration of an image processing apparatus according to an exemplary embodiment.

FIG. 1 is a block diagram illustrating an exemplary hardware configuration of an image processing apparatus 1 according to the exemplary embodiment.

The image processing apparatus 1 according to the exemplary embodiment includes a controller 100, a storage unit 200, a display 300, an operation unit 400, an image acquiring unit 500, and a bus 600. The controller 100 performs image processing computing and controls operations of the units included in the apparatus. The storage unit 200 stores image data and the like. The display 300 displays images that are to be processed and processing results. The operation unit 400 is used to receive user instructions for the apparatus. The image acquiring unit 500 is used to acquire image data that is to be processed. The bus 600 connects the units to one another.

The controller 100 is configured as a so-called computer including a central processing unit (CPU), a read only memory (ROM), and a random access memory (RAM) which are not illustrated.

The ROM is used to store control programs executed by the CPU. The CPU reads programs stored in the ROM, and uses the RAM as a work area so as to execute the programs. The CPU executing programs implements functions of a dynamic-range correcting unit 110 (see FIG. 3) and the like which are described below.

Programs executed by the CPU may be stored in a storage device connected in the outside of the image processing apparatus 1, not in the ROM in the controller 100. For example, programs may be stored in a computer-readable recording medium, such as a magnetic recording medium (for example, a magnetic tape or a magnetic disk), an optical recording medium (for example, an optical disk), a magneto-optical recording medium, or a semiconductor memory.

Programs executed by the CPU may be downloaded to the image processing apparatus 1 by using a communication unit such as the Internet.

The storage unit 200 is constituted, for example, by a hard disk device, and stores various types of data including image data corresponding to a target image serving as a destination for pasting and a source image serving as a source for pasting. The storage unit 200 may store programs executed by the controller 100.

The display 300 is constituted, for example, by a liquid crystal display or an organic electroluminescence (EL) display, and displays a source image and a target image that are handled in a pasting and blending operation, under control exerted by the controller 100.

The operation unit 400 is an input device for receiving user operations, and is constituted, for example, by a touch panel disposed on the surface side of the liquid crystal display, a mouse, and a keyboard.

The image acquiring unit 500 is a device used to acquire image data that is to be processed, and is constituted, for example, by an interface connected to external devices. Image data acquired by the image acquiring unit 500 is stored in the storage unit 200.

Terms

Figure 2:
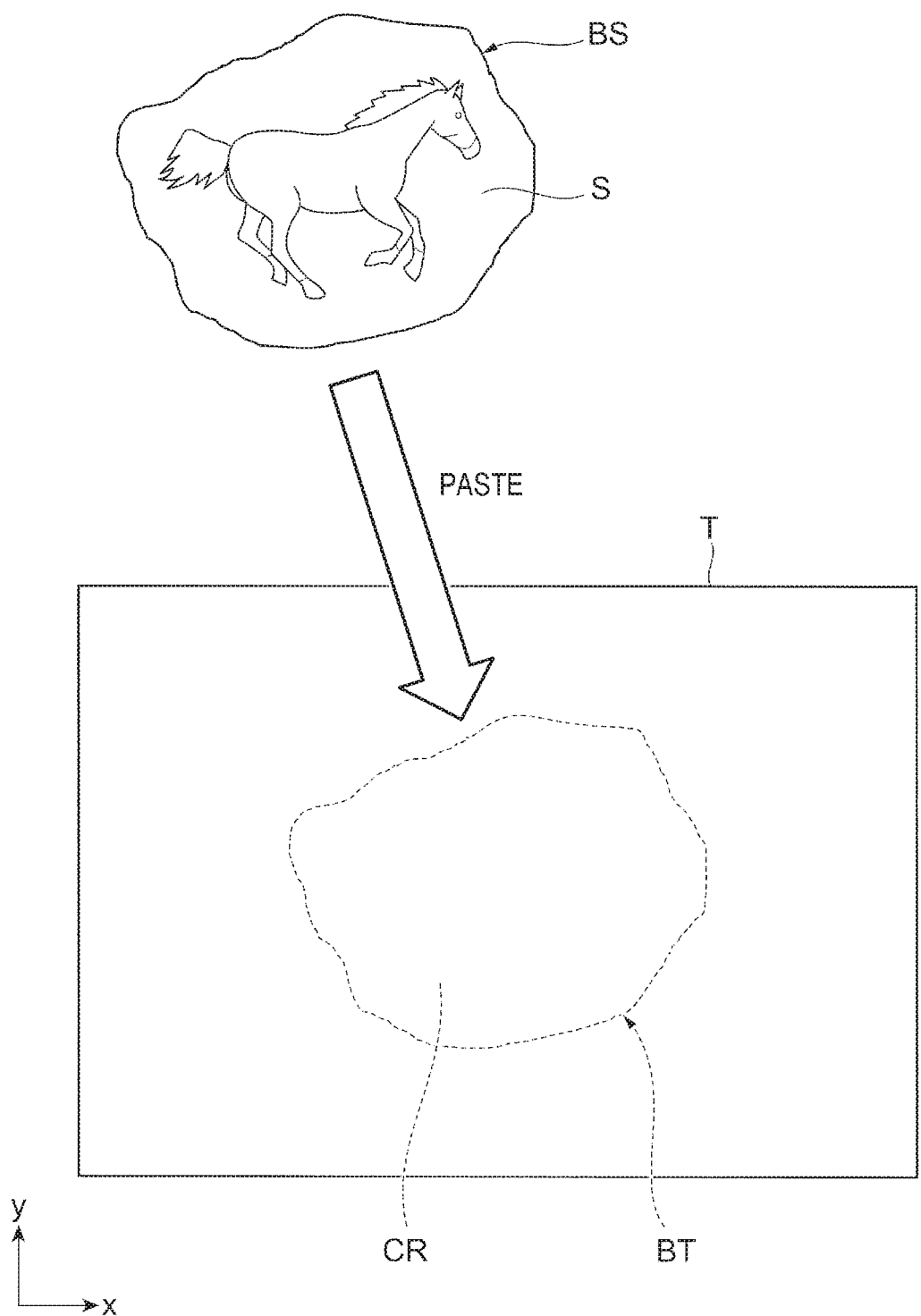
FIG. 2 is a diagram for describing the relationship between a source image that serves as a source for pasting and a target image that serves as a destination for pasting.

FIG. 2 is a diagram for describing the relationship between a source image S serving as a source for pasting and a target image T serving as a destination for pasting.

In the case of FIG. 2, in both of the x axis direction and the y axis direction, the source image S is smaller than the target image T, and the entire source image S is included in the target image T. The source image S in this example is an exemplary "second image" in the scope of claims. The target image T is an exemplary "first image".

When the source image S is to be pasted on and blended into the target image T, the controller 100 according to the exemplary embodiment performs a blending operation so that, firstly, white defects or black defects do not occur in an overlapping portion (a blended region CR) of the two images and, secondly, a seam between the images is inconspicuously viewed. Therefore, it is not always necessary for the source image S to be smaller than the target image T.

An outer edge portion of the source image S provides a source-image-side boundary BS after a pasting and blending operation. In contrast, an outer edge portion of a subregion (that is, the blended region CR) of the target image T on which the source image S is pasted provides a target-image-side boundary BT after a pasting and blending operation. In the description below, a combination of the source-image-side boundary BS and the target-image-side boundary BT is called a composite boundary.

In a blended image generated through a pasting and blending operation, the pixels on the source-image-side boundary BS and the pixels on the target-image-side boundary BT are adjacent to each other.

The blended region CR is a subregion of the target image T which is superimposed on the source image S during an operation of pasting the source image S or at a time point of completion of the pasting operation.

In the exemplary embodiment, the state in which the composite boundary is inconspicuously viewed indicates that the brightness (luminance, lightness, or the like) or chrominance of the pixels disposed on the source-image-side boundary BS and the target-image-side boundary BT is small enough for the source-image-side boundary BS and the target-image-side boundary BT not to be visually discriminated from each other. More specifically, the state indicates that a change in brightness or a change in color in the composite boundary is smooth (seamless) between the source image S and the target image T.

Functional Configurations of the Image Processing Apparatus

A functional configuration implemented by the controller 100 executing programs will be described below.

There are various functional configurations implemented through execution of programs. In the description below, they are called a first functional configuration, a second functional configuration, and a third functional configuration for convenience's sake.

The First Functional Configuration

Figure 3:
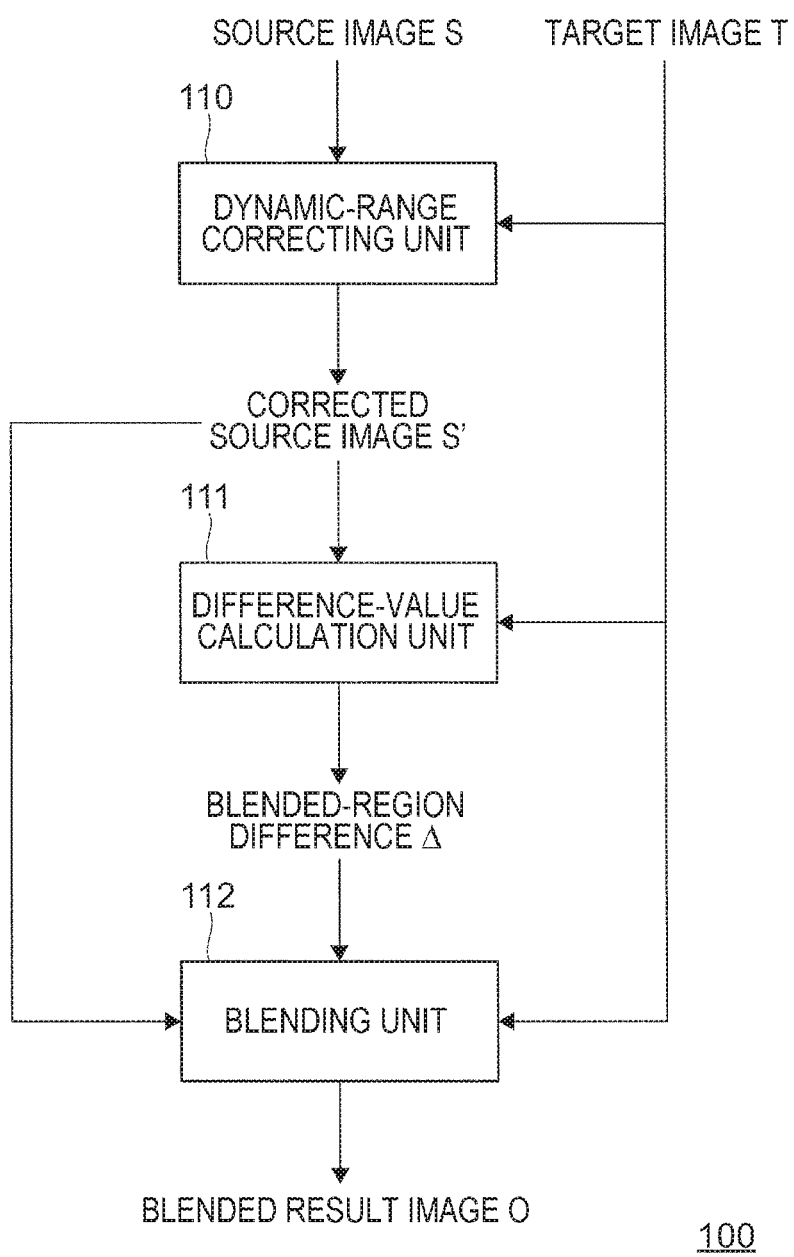
FIG. 3 is a block diagram illustrating a first functional configuration of a controller according to the exemplary embodiment.

FIG. 3 is a block diagram illustrating a first functional configuration of the controller 100 according to the functional configuration.

The controller 100 according to the first functional configuration functions as the dynamic-range correcting unit 110, a difference-value calculation unit 111, and a blending unit 112. The dynamic-range correcting unit 110 corrects the dynamic range width of the source image S in accordance with pixel information (pixel information of the target-image-side boundary BT) of the target image T that is in contact with the source image S. The difference-value calculation unit 111 calculates difference values between the pixel values of a source image (that is, a corrected source image S') after correction of the dynamic range width and the pixel values of the target-image-side boundary BT. On the basis of the calculated difference values, the blending unit 112 blends, through correction, the corrected source image S' into the target image T so that the seam in contact with the target image T is inconspicuously viewed.

The dynamic-range correcting unit 110 is an exemplary "correcting unit" in the scope of claims. The difference-value calculation unit 111 and the blending unit 112 are an exemplary "pasting unit" in the scope of claims.

Processes of the Dynamic-Range Correcting Unit

The dynamic-range correcting unit 110 is a functional component that corrects the dynamic range $D_S$ of the source image S on the basis of the pixel values of the target-image-side boundary BT so that white defects or black defects do not occur after the pasting and blending operation.

Figure 4:
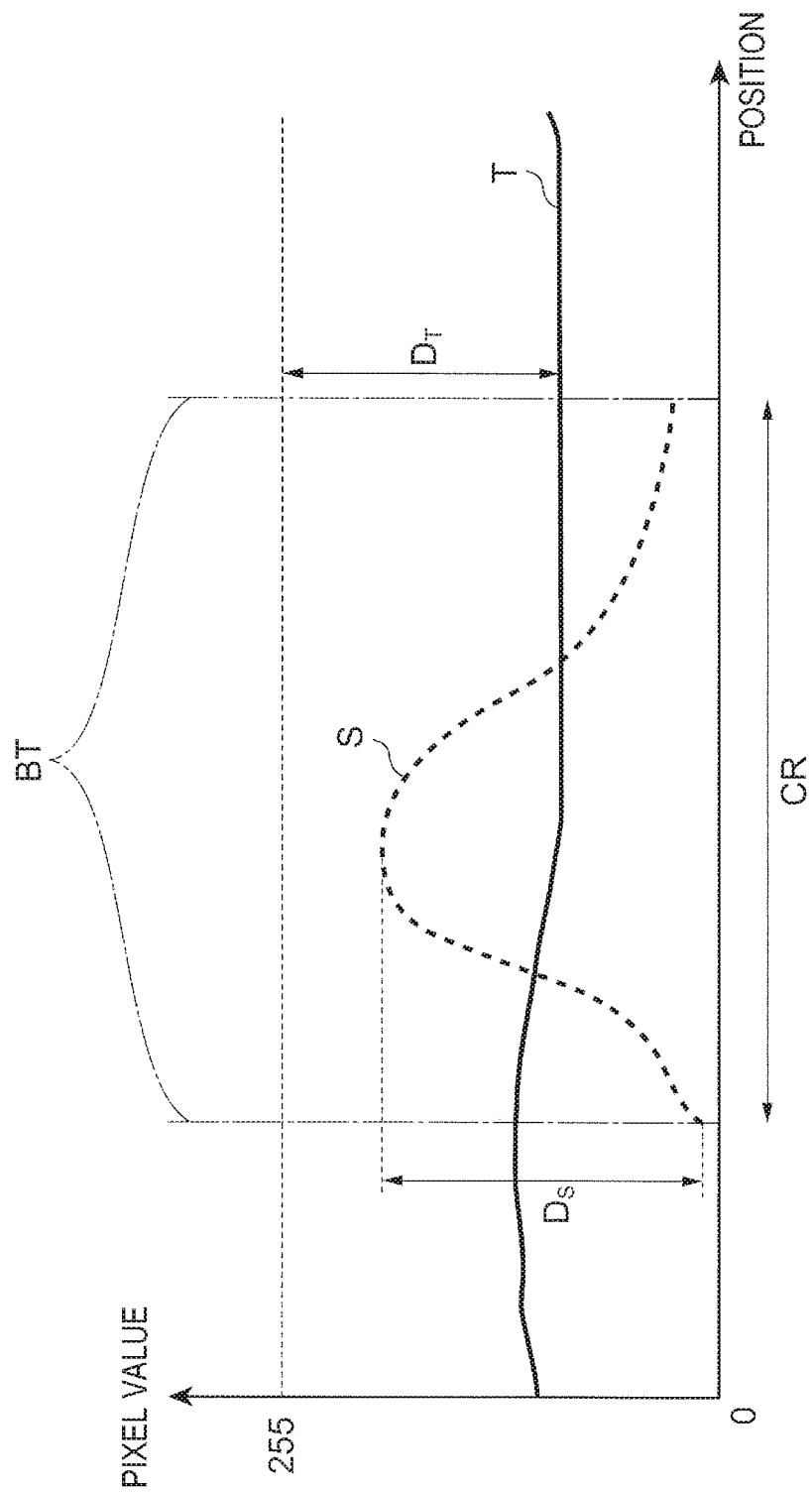
FIG. 4 is a diagram for describing the relationship between the dynamic range of a source image and the dynamic range of a target-image-side boundary in a target image.

FIG. 4 is a diagram for describing the relationship between the dynamic range $D_S$ of the source image S and the dynamic range $D_T$ of the target-image-side boundary BT in the target image T.

Description will be made below by assuming that the source image S and the target image T are 8-bit red, green, blue (RGB) images having gradation values from 0 to 255.

The dynamic-range correcting unit 110 obtains the averages $R_{ave}$, $G_{ave}$, and $B_{ave}$ of the pixels on the target-image-side boundary BT of the target image T by using Expressions 1 to 3.

$$R_{ave} = \frac{1}{n_b} \sum_{\Omega_b} R_T(i, j) \qquad \text{Expression 1}$$

$$G_{ave} = \frac{1}{n_b} \sum_{\Omega_b} G_T(i, j) \qquad \text{Expression 2}$$

$$B_{ave} = \frac{1}{n_b} \sum_{\Omega_b} B_T(i, j) \qquad \text{Expression 3}$$

In these expressions, $\Omega_b$ represents the target-image-side boundary BT; $n_b$ represents the number of pixels on the target-image-side boundary BT; $R_T(i, j)$ represents a red (R) pixel value in the target-image-side boundary BT; $G_T(i, j)$ represents a green (G) pixel value in the target-image-side boundary BT; and $B_T(i, j)$ represents a blue (B) pixel value in the target-image-side boundary BT.

When the averages $R_{ave}$, $G_{ave}$, and $B_{ave}$ are obtained, the dynamic range $D_T$, up to the saturation value, of the target-image-side boundary BT is determined. For each color, the dynamic range width in which white defects do not occur is calculated with 255 minus the corresponding one of the averages. The dynamic range width in which black defects do not occur is the average of each color itself.

The dynamic-range correcting unit 110 then obtains the dynamic range $D_{SR}$ for the R pixel values of the pixels on the source image S, the dynamic range $D_{SG}$ for the G pixel values, and the dynamic range $D_{SB}$ for the B pixel values by using Expressions 4 to 6. When the source image S overlaps the target image T, the following calculation is performed on the overlapping portion.

$$D_{SR} = \max(R_S(i,j)) - \min(R_S(i,j)) \qquad \text{Expression 4}$$

$$D_{SG} = \max(G_S(i,j)) - \min(G_S(i,j)) \qquad \text{Expression 5}$$

$$D_{SB} = \max(B_S(i,j)) - \min(B_S(i,j)) \qquad \text{Expression 6}$$

In these expressions, $R_S(i, j)$ represents the R pixel value at a position (i, j) in the source image S; $G_S(i, j)$ represents the G pixel value at the position (i, j) in the source image S; and $B_S(i, j)$ represents the B pixel value at the position (i, j)

in the source image S. Hereinafter, they are also simply referred to as $R_S$, $G_S$, and $B_S$.

In Expressions 4 to 6, a value obtained by subtracting the minimum value from the maximum value is calculated as the dynamic range $D_S$ for each of the R pixel value, the G pixel value, and the B pixel value without any additional operation. Alternatively, a process for precluding possibility of determining an erroneous value as the maximum value or the minimum value due to influence from noise or the like may be additionally performed.

For example, the average of pixel values, the number of which is equal to several percent of the number of all of the pixel values, on the larger pixel value side may be used as the maximum value, and the average of pixel values, the number of which is equal to several percent of the number of all of the pixel values, on the smaller pixel value side may be used as the minimum value.

Subsequently, the dynamic-range correcting unit 110 calculates compression rates $C_R$, $C_G$, and $C_B$ for compressing the dynamic range $D_S$. At that time, the dynamic-range correcting unit 110 calculates the averages of the values of all pixels included in the source image S, and compares the calculated pixel values with the respective averages $R_{ave}$, $G_{ave}$, and $B_{ave}$ of the pixels on the target-image-side boundary BT.

When the averages of the pixel values of the source image S are larger than the respective averages $R_{ave}$, $G_{ave}$, and $B_{ave}$ of the pixels on the target-image-side boundary BT, white defects may occur. When the averages of the pixel values of the source image S are smaller than the respective averages $R_{ave}$, $G_{ave}$, and $B_{ave}$ of the pixels on the target-image-side boundary BT, black defects may occur.

When the dynamic range $D_S$ of the source image S is smaller than the dynamic range $D_T$, up to the saturation value, of the target-image-side boundary BT, white defects and the like are not likely to occur. Therefore, a compression process described below may be skipped.

In the exemplary embodiment, it is assumed that the dynamic range $D_S$ of the source image S is larger than the dynamic range $D_T$, up to the saturation value, of the target-image-side boundary BT, and that the dynamic range $D_S$ needs to be compressed.

In this case, the dynamic-range correcting unit 110 calculates the compression rates $C_R$, $C_G$, and $C_B$ by using Expressions 7 to 9.

$$C_R = (255 - R_{ave})/D_{SR} \quad \text{Expression 7}$$

$$C_G = (255 - G_{ave})/D_{SG} \quad \text{Expression 8}$$

$$C_B = (255 - B_{ave})/D_{SB} \quad \text{Expression 9}$$

In these expressions, $C_R$ is a compression rate for red (R); $C_G$ is a compression rate for green (G); and $C_B$ is a compression rate for blue (B).

The dynamic-range correcting unit 110 applies the compression rates $C_R$, $C_G$, and $C_B$ obtained by using Expressions 7 to 9, to Expressions 10 to 12, and corrects and compresses the dynamic range $D_S$ for the R pixel values, the G pixel values, and the B pixel values of the source image S.

$$R'_S = C_R\{R_S - \min(R_S)\} + \min(R_S) \quad \text{Expression 10}$$

$$G'_S = C_G\{G_S - \min(G_S)\} + \min(G_S) \quad \text{Expression 11}$$

$$B'_S = C_B\{B_S - \min(B_S)\} + \min(B_S) \quad \text{Expression 12}$$

In these expressions, $R'_S$ represents an R pixel value of the corrected source image S'; $G'_S$ represents a G pixel value of the corrected source image S'; and $B'_S$ represents a B pixel value of the corrected source image S'.

The compression operation causes the values of each pixel included in the source image S to be decreased toward the minimum values of the colors.

In the description above, the dynamic range $D_S$ is compressed for the R pixel component, the G pixel component, and the B pixel component, separately, which are used as a unit of processing. For example, in terms of brightness (luminance or lightness), the R pixel values, the G pixel values, and the B pixel values may be corrected and compressed with the same compression rate in accordance with the difference in brightness.

In the description above, the dynamic range $D_S$ is compressed in the RGB color space. Alternatively, in terms of the pixel values in a color space other than the RGB color space (for example, the hue, saturation, value (HSV) color space, the CIELab color space, the XYZ color space, or the Luv color space), the dynamic range $D_S$ may be compressed.

In terms of chrominance instead of brightness, the dynamic range $D_S$ for the R pixel value, the G pixel value, and the B pixel value may be compressed with the same compression rate in accordance with the magnitude of the chrominance.

Instead of always compressing the dynamic range $D_S$, only when a brightness difference or chrominance is equal to or larger than a threshold, the dynamic range $D_S$ may be compressed. When the seam is inconspicuously viewed, compression of the dynamic range $D_S$ is skipped, achieving effective use of computational resources.

In the above-described exemplary embodiment, the dynamic range $D_S$ is compressed so that white defects do not occur. Therefore, the minimum value is used as a reference value, and the dynamic range $D_S$ is compressed in accordance with the difference from the minimum value. When the dynamic range $D_S$ is compressed so that black defects do not occur, the maximum value is used as a reference value, and the dynamic range $D_S$ may be compressed in accordance with the difference from the maximum value.

Processes of the Difference-Value Calculation Unit

Processes performed by the difference-value calculation unit 111 will be described.

The difference-value calculation unit 111 is a functional component that calculates correction amounts (hereinafter referred to as "blended-region differences Δ") for correcting the pixel values of the corrected source image S' (an image generated by compressing the dynamic range $D_S$ of the source image S) so that, when the corrected source image S' is pasted on and blended into the target image T, the source-image-side boundary BS is in smooth contact with the pixels in the target-image-side boundary BT.

Figure 5:
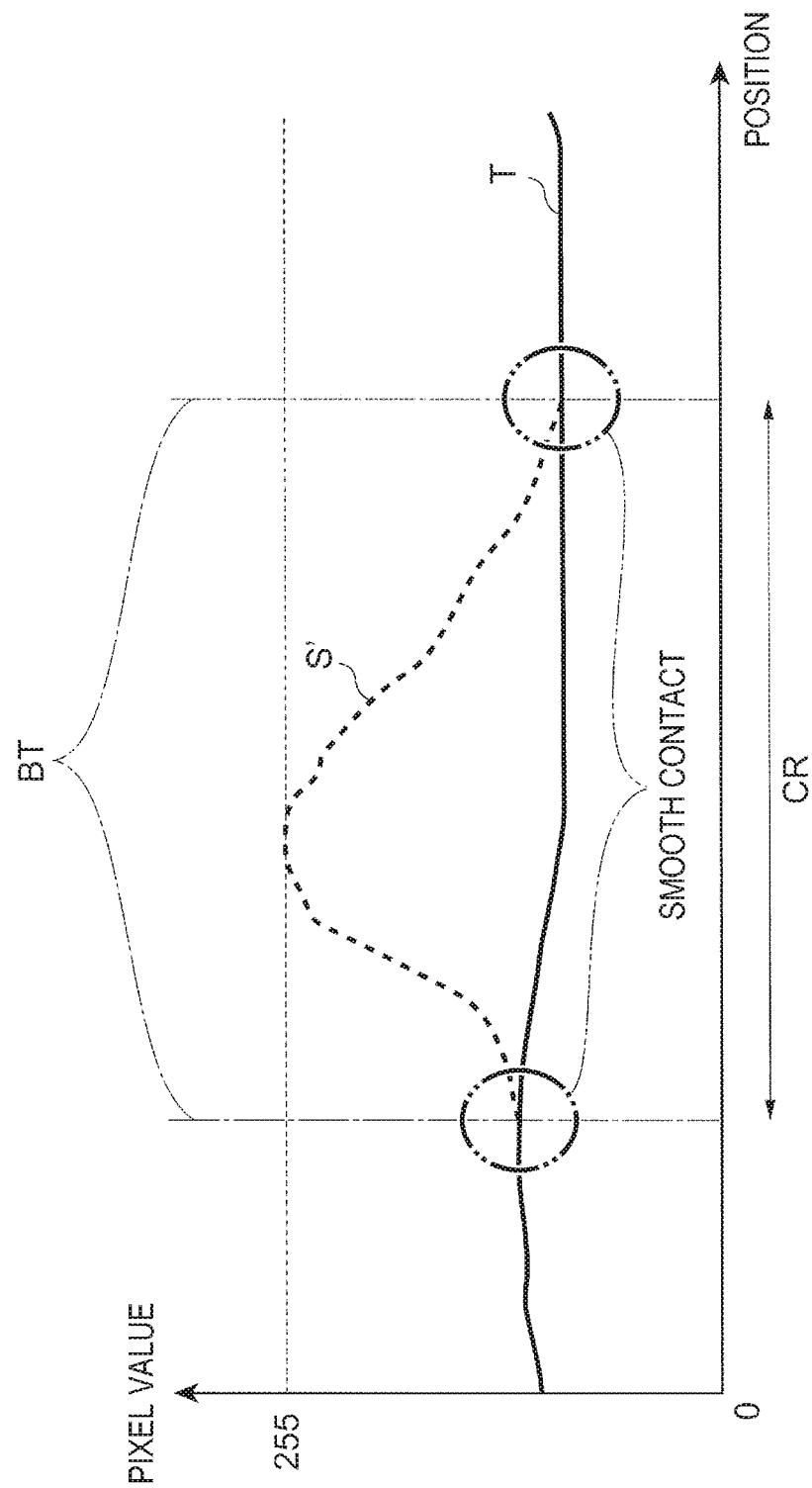
FIG. 5 is a diagram for describing regions in which smooth connection is to be obtained.

FIG. 5 is a diagram for describing regions in which smooth connection is to be obtained. When the pixel values of the source-image-side boundary BS of the corrected source image S' whose dynamic range $D_S$ is compressed simply match the pixel values of the target-image-side boundary BT, the composite boundary may be conspicuously viewed.

Figure 6:
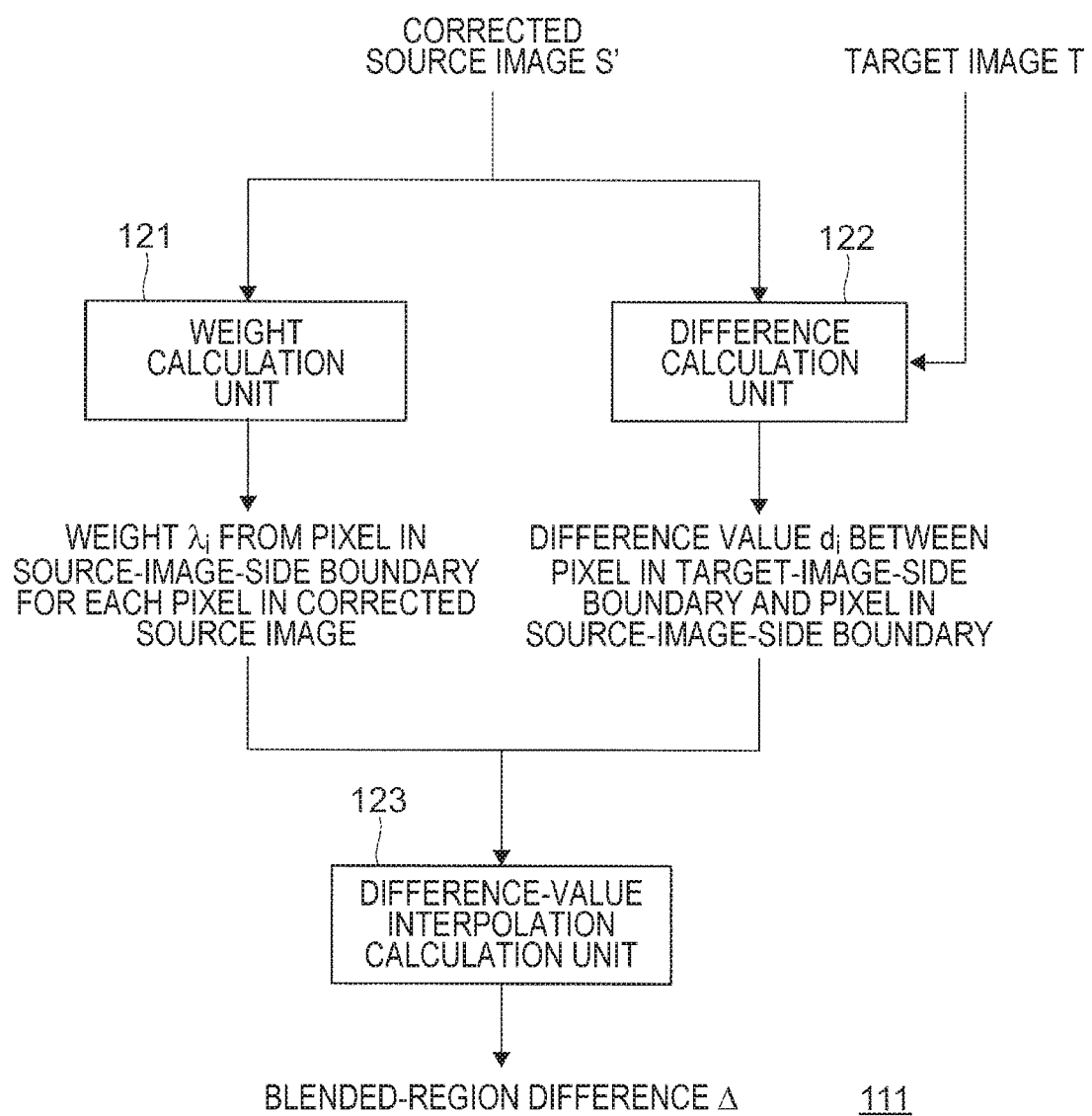
FIG. 6 is a block diagram illustrating exemplary processes performed by a difference-value calculation unit.

FIG. 6 is a block diagram illustrating exemplary processes performed by the difference-value calculation unit 111.

The difference-value calculation unit 111 includes a weight calculation unit 121, a difference calculation unit 122, and a difference-value interpolation calculation unit 123. The weight calculation unit 121 calculates a weight from the source-image-side boundary BS for each pixel of the corrected source image S'. The difference calculation unit 122 calculates the difference in pixel information for the composite boundary between the corrected source image S' and the target image T. The difference-value interpolation calculation unit 123 calculates the blended-region differences Δ as correction amounts for each pixel of the corrected source image S' by using the calculated weights and differences.

By using Expression 13, the weight calculation unit 121 obtains a weight $\lambda_i$ from the i-th pixel in the composite boundary of the corrected source image S' for each position x in the corrected source image S'.

$$\lambda_i = \frac{w_i}{\sum_{j=0}^{n_b-1} w_j} \qquad \text{Expression 13}$$

In the expression, i represents an index for identifying the position of a pixel in the composite boundary of the corrected source image S'. All of the pixels on the composite boundary of the corrected source image S' are indexed in one direction (for example, clockwise or counterclockwise) with a pixel which is located at a specific position in the composite boundary of the corrected source image S' and whose index is 0.

The symbol $w_i$ represents a value obtained through calculation using Expression 14.

$$w_i = \frac{\tan(\alpha_{i-1}/2) + \tan(\alpha_i/2)}{\|p_i - x\|} \qquad \text{Expression 14}$$

Figure 7:
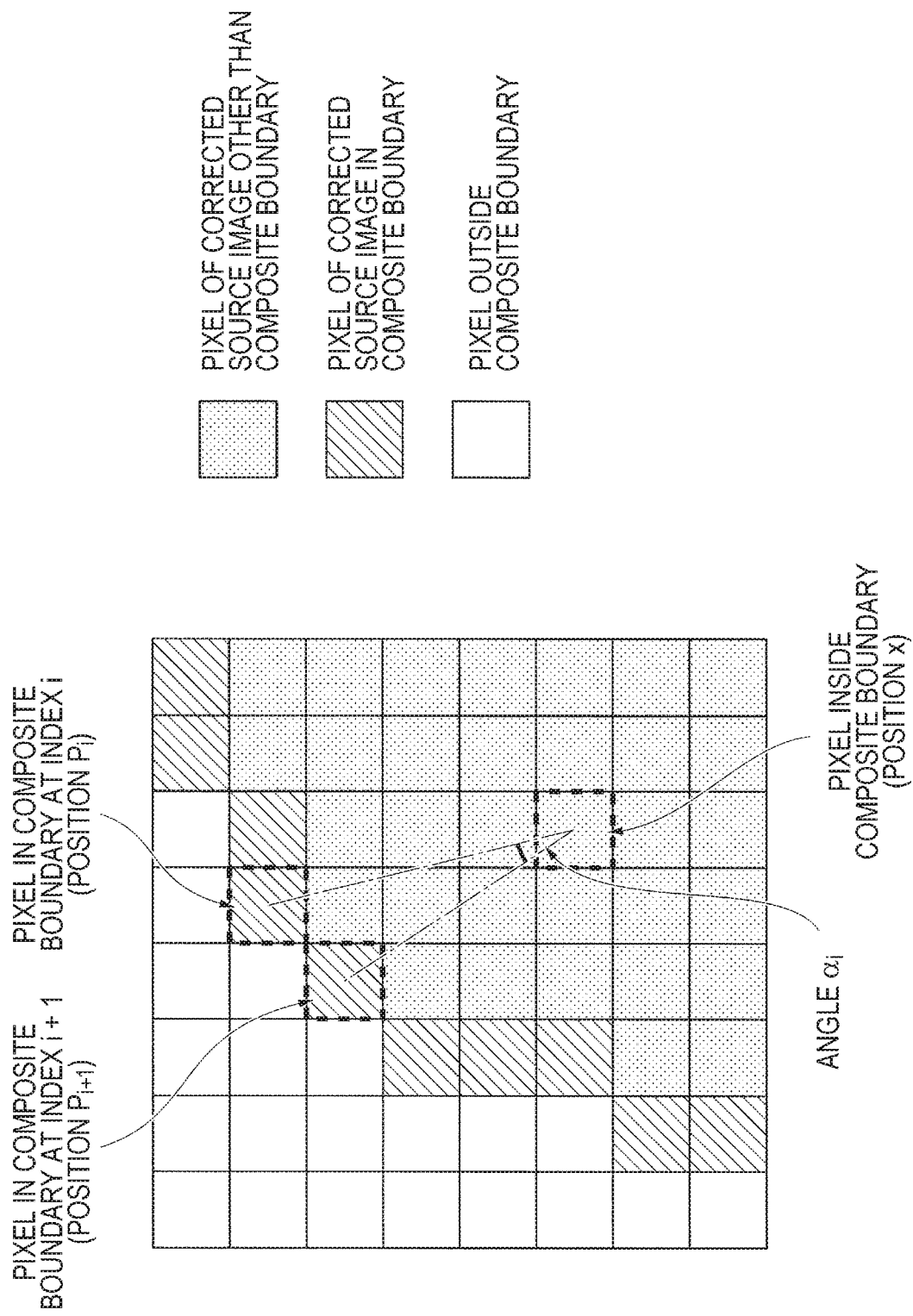
FIG. 7 is a diagram for describing a process of calculating $w_i$ used in calculation of a weight $\lambda_i$.

FIG. 7 is a diagram for describing diagrammatic meaning of $w_i$ and α in this example. In FIG. 7, a hatched pixel represents a pixel in the composite boundary of the corrected source image S' pasted on the blended region CR, and is given the above-described index i. In FIG. 7, a shaded image represents a pixel in the corrected source image S', other than the composite boundary, which is pasted on the blended region CR.

In FIG. 7, the position $P_i$ is represented by a positional vector indicating a pixel in the composite boundary which is identified by the index i. The position x is represented by a positional vector providing a pixel in the corrected source image S' other than the composite boundary.

The symbol $\alpha_i$ represents an angle between a vector from the position $P_i$, corresponding to the index i, to the position x and a vector from the position corresponding to the index i+1, to the position x.

In the calculation process, when the index i reaches $n_b$, the index is replaced with 0.

Expression 14 gives $w_i$ for a position x so that, when the pixel at the position x is closer to the composite boundary of the corrected source image S', $w_i$ increases sharply, and, when the pixel at the position x is farther from the composite boundary of the corrected source image S', $w_i$ decreases sharply.

Therefore, the weight $\lambda_i$ from the i-th pixel in the composite boundary of the corrected source image S' for the position x in Expression 13 is obtained as a ratio of $w_i$ corresponding to each position $P_i$ with respect to the total of the values $w_i$ calculated for all of the pixels (the index is 0 to $n_{b-1}$) on the composite boundary of the corrected source image S'.

Returning to FIG. 6, description will be made.

The difference calculation unit 122 obtains the difference values $dR_i$, $dG_i$, and $dB_i$ between pixel values $R_T$, $G_T$, and $B_T$ of the target-image-side boundary BT and pixel values $R'_S$, $G'_S$, and $B'_S$ of the composite boundary (source-image-side boundary BS) of the corrected source image S' by using Expressions 15 to 17.

$$dR_i = R_T - R'_S \qquad \text{Expression 15}$$

$$dG_i = G_T - G'_S \qquad \text{Expression 16}$$

$$dB_i = B_T - B'_S \qquad \text{Expression 17}$$

When the calculated weight values λi and the difference values di of the composite boundary are given, the difference-value interpolation calculation unit 123 calculates blended-region differences ΔR, ΔG, and ΔB which provide correction amounts for each pixel x in the corrected source image S' pasted on the blended region CR by using Expressions 18 to 20.

$$\Delta R = \sum_{i=0}^{n_b-1} \lambda_i dR_i \qquad \text{Expression 18}$$

$$\Delta G = \sum_{i=0}^{n_b-1} \lambda_i dG_i \qquad \text{Expression 19}$$

$$\Delta B = \sum_{i=b}^{n_b-1} \lambda_i dB_i \qquad \text{Expression 20}$$

The blended-region differences ΔR, ΔG, and ΔB are used to correct the pixel values of each pixel x of the corrected source image S' so that a change in pixel value on the composite boundary is smooth (or seamless).

As illustrated in Expressions 18 to 20, the blended-region differences ΔR, ΔG, and ΔB that provide correction amounts for each pixel x are values obtained by receiving influence from the weights λi, the number of which is equal to $n_b$ and which are obtained through calculation for the pixels (i=0 to $n_{b-1}$) on the composite boundary. That is, the blended-region differences ΔR, ΔG, and ΔB are determined by the relationship with the multiple pixels in the outside region (target-image-side boundary BT) of the blended region CR.

More specifically, the calculation result for a pixel x located close to the composite boundary is regarded as a value obtained by averaging the difference values $dR_i$, $dG_i$, and $dB_i$ of the multiple pixels in a region of the composite boundary which is located near the pixel x. The calculation result for a pixel x located far from the composite boundary is regarded as a value obtained by averaging the difference values $dR_i$, $dG_i$, and $dB_i$ of all pixels on the entire composite boundary. As a result, a change in the seam is smooth.

Returning to FIG. 3, description will be made.

The blending unit 112 modifies the corrected source image S' (an image obtained after compressing and correcting the dynamic range $D_S$ of the source image S) obtained by the dynamic-range correcting unit 110, through the blended-region differences Δ obtained by the difference-value calculation unit 111, and pastes, for blending, the modified, corrected source image S' on the blended region CR of the target image T.

Specifically, the pixel values of each pixel x in the corrected source image S' pasted on the blended region CR are modified into values obtained through calculation using Expressions 21 to 23.

$$R=R'_S+\Delta R \quad \text{Expression 21}$$

$$G=G'_S+\Delta G \quad \text{Expression 22}$$

$$B=B'_S+\Delta B \quad \text{Expression 23}$$

This modification provides the modified, corrected source image S' whose gradation levels are shifted so that a change in pixel value near the boundary of the corrected source image S', which is pasted on the target-image-side boundary BT and the blended region CR, is smooth. The resulting image is pasted on and blended into the target image T. Thus, a blended result image O is obtained.

As described before, the pixel values of a pixel in a target image T region remain the same before and after the pasting and blending operation.

In the blended result image O generated through the above-described procedure, white defects or black defects do not occur in the blended region CR. In addition, the seam between the pasted, corrected source image S' that has been modified and the target image T is inconspicuously viewed.

In the description above, the difference-value calculation unit 111 calculates the difference values for the R pixel value, the G pixel value, and the B pixel value. Similarly to the process of compressing the dynamic range $D_S$, difference values may be calculated for the respective elements in another color space. For example, brightness (luminance or lightness), such as the lightness (V) value in the HSV color space, may be used.

The Second Functional Configuration

When the compression rate for the dynamic range $D_S$ of the source image S is too large, the amount of gradation information of the modified, corrected source image S' which is included in the blended result image O may be too small.

In this case, it is desirable that the dynamic range $D_T$ of the target image T be slightly compressed and a dynamic range width enough for gradation expression of the corrected source image S' be acquired.

Therefore, the following method is employed in the second functional configuration. Before compression of the dynamic range $D_S$ of the source image S, a compression rate (a "source-dynamic-range correction amount" described below) is calculated in advance. When the compression rate is less than a predetermined threshold, only the dynamic range $D_S$ of the source image S is compressed as in the first functional configuration. When the compression rate is more than the predetermined threshold, the dynamic range $D_T$ of the target image T is also compressed.

Figure 8:
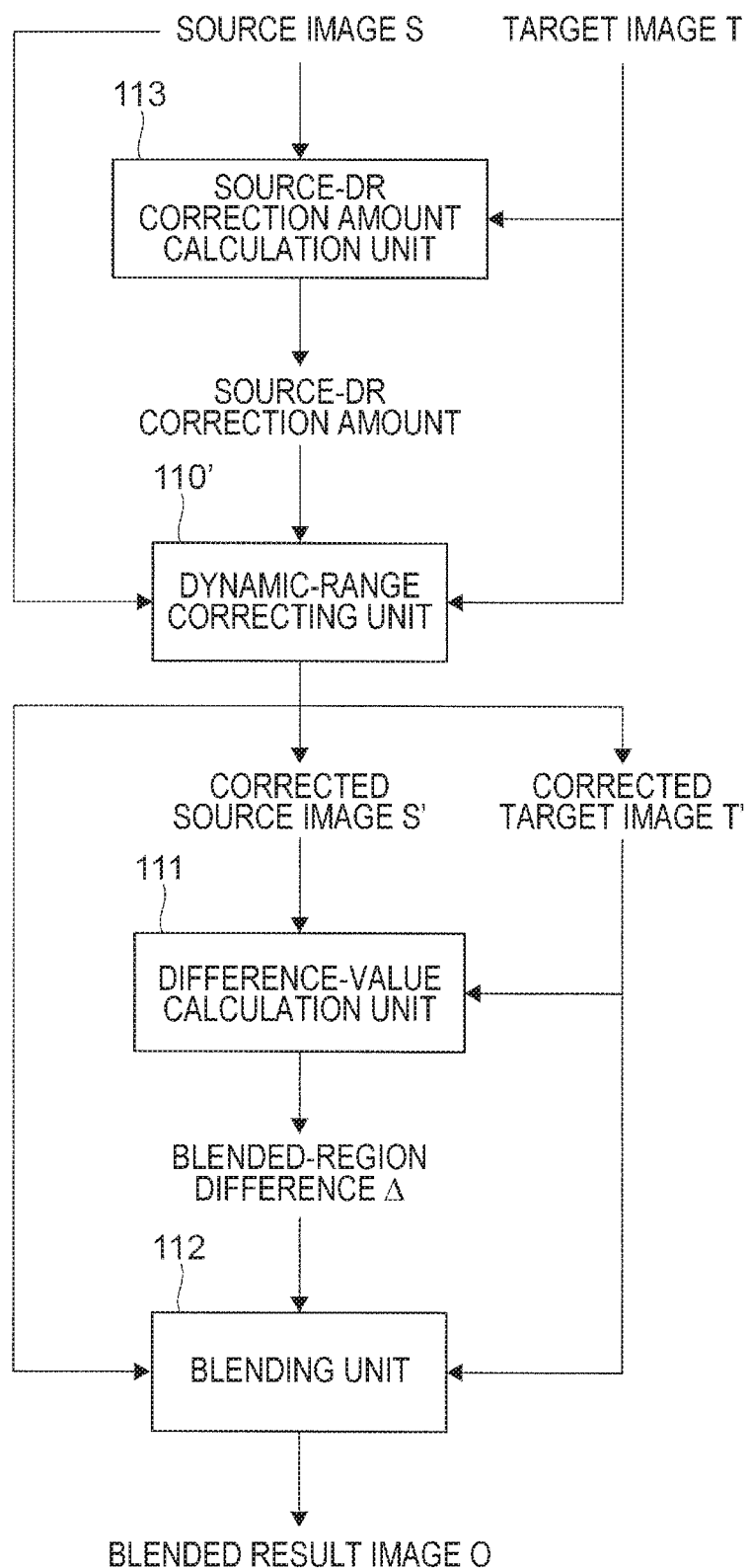
FIG. 8 is a block diagram illustrating a second functional configuration of the controller according to the exemplary embodiment.

FIG. 8 is a block diagram illustrating the second functional configuration of the controller 100 according to the exemplary embodiment. In FIG. 8, components corresponding to those in FIG. 3 are designated with identical reference numerals.

The controller 100 according to the second functional configuration further includes a source-dynamic-range correction amount calculation unit 113 that calculates the compression rates $C_R$, $C_G$, and $C_B$ of the source image S in accordance with pixel information of the target image T that is in contact with the source image S. Specifically, the source-dynamic-range correction amount calculation unit 113 performs calculations using Expressions 1 to 9 in the first functional configuration, and calculates the compression rate $C_R$ for the R pixel value, the compression rate $C_G$ for the G pixel value, and the compression rate $C_B$ for the B pixel value. These compression rates are output as source-dynamic-range correction amounts.

The source-dynamic-range correction amount calculation unit 113 is an exemplary "correcting unit" in the scope of claims.

The compression rates $C_R$, $C_G$, and $C_B$ calculated by the source-dynamic-range correction amount calculation unit 113 are provided to a dynamic-range correcting unit 110' as source-dynamic-range correction amounts.

The dynamic-range correcting unit 110' compares each of the received source-dynamic-range correction amounts (compression rates $C_R$, $C_G$, and $C_B$) with a threshold. The threshold may be prepared for each color, or the same value may be used.

When the compression rates $C_R$, $C_G$, and $C_B$ are less than the threshold(s), the same process as that in the first functional configuration is performed. That is, the dynamic-range correcting unit 110' compresses only the dynamic range $D_S$ of the source image S, and preserves the dynamic range $D_T$ of the target image T as it is.

In contrast, when the compression rates $C_R$, $C_G$, and $C_B$ are more than the threshold(s), the dynamic-range correcting unit 110' compresses the dynamic range $D_T$ of the target image T by a predetermined ratio (for example, 10%), and generates a corrected target image T'. In the difference-value calculation unit 111 and the blending unit 112, the corrected target image T' is used instead of the target image T in the first functional configuration.

When the corrected target image T' is obtained, similarly to the first functional configuration, the dynamic-range correcting unit 110' calculates the averages $R_{ave}$, $G_{ave}$, and $B_{ave}$ of the pixels on the target-image-side boundary BT by using Expressions 1 to 3, and performs the same processes as those in the first functional configuration after that.

In the case of the second functional configuration, in addition to the effect of the first functional configuration that the source image S is pasted on the target image T so that, firstly, white defects or black defects do not occur and, secondly, the boundary of a pasting portion is inconspicuously viewed, occurrence of too little amount of gradation information of the corrected source image S' in the blended result image O is avoided.

The Third Functional Configuration

A configuration in which the difference-value calculation unit 111 is removed from the first functional configuration will be described. Therefore, in the third functional configuration, a case in which a gradient-based image editing technique is applied to the corrected source image S', which is pasted on and blended into the target image T, will be described.

Figure 9:
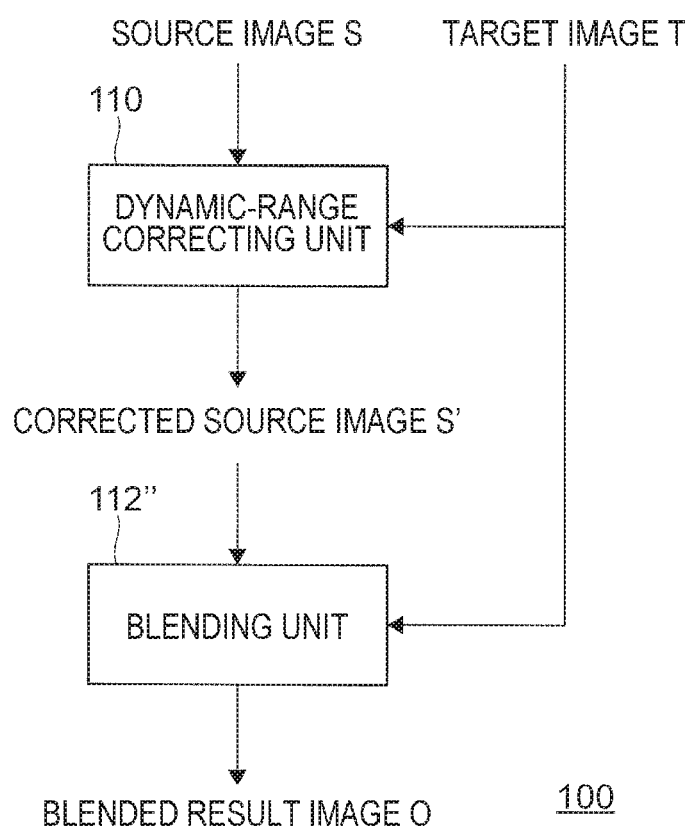
FIG. 9 is a block diagram illustrating a third functional configuration of the controller according to the exemplary embodiment.

FIG. 9 is a block diagram illustrating the third functional configuration of the controller 100 according to the exemplary embodiment. In FIG. 9, components corresponding to those in FIG. 3 are designated with identical reference numerals.

As illustrated in FIG. 9, in the controller 100 according to the third functional configuration, a blending unit 112" having a gradient-based image editing technique is used, and the target image T is corrected so that gradient information of the corrected source image S' is preserved. A Poisson image editing method is used as an exemplary gradient-based image editing technique.

The blending unit 112" resolves a Poisson equation for obtaining values such that as many gradients as possible of the pixel values of the corrected source image S' are preserved under the condition that the pixel values of the composite boundary of the corrected source image S' match the pixel values of the composite boundary of the target image T. Thus, the blending unit 112" obtains the pixel values of the blended region CR.

Specifically, calculation using Expression 24 described below is repeatedly performed. Thus, pixel values corrected so that the boundary portion is inconspicuously viewed when the corrected source image S' is pasted on the target image T are obtained.

$$f_p = \frac{\sum_{q \in N_p} f_q + \sum_{q \in N_p} (g_p - g_q)}{N_p}$$ Expression 24

In the expression, $f_p$ represents a corrected pixel value at the position p in the blended region CR of the target image T, and $f_q$ represents a corrected pixel value of a pixel near the position p.

Figure 10:
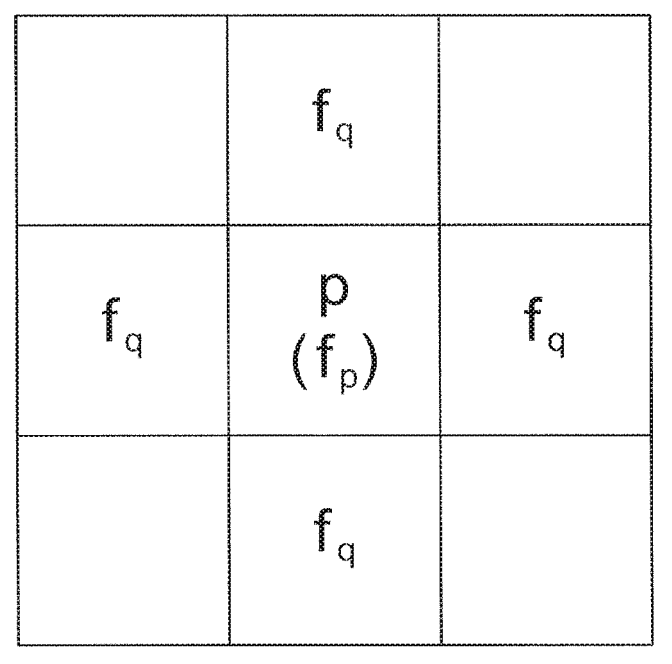

FIG. 10 is a diagram for describing the positional relationship between the position p and nearby images. In the example in FIG. 10, four upper, lower, left, and right pixels around the position p are used as pixels near the position p. As the initial values of $f_p$ and $f_q$, pixel values before correction are used.

In addition, $g_p$ and $g_q$ represent the pixel value at the position p and the pixel value of a nearby pixel in the corrected source image S'. Therefore, the second term in the numerator describes image gradient information of the corrected source image S'.

The symbol $N_p$ represents the number of nearby pixels around the position p. For example, since the nearby pixels are four upper, lower, left, and right pixels in the case in FIG. 10, the denominator of Expression 24 is four.

Therefore, Expression 24 describes that the pixel value at a position p is updated by using a value obtained by adding the average pixel value of nearby pixels in the target image T to the average gradient value of nearby pixels in the corrected source image S'.

That is, the blending unit 112" repeatedly performs the calculation using Expression 24. Thus, the target image T is corrected so as to be close to the corrected source image S'. When a change in the $f_p$ value is equal to or smaller than a preset threshold, the change is regarded as having converged, and the calculation is ended. As a result of the calculation, the final pixel values $f_p$ of the blended region CR are obtained, and change in the seam between the target image T and the corrected source image S' in the composite boundary is made smooth.

When the target image T and the corrected source image S' are expressed, for example, in the RGB color space, the calculation is performed for each of the R pixel value, the G pixel value, and the B pixel value. As a matter of course, when the target image T and the source image S are expressed in another color space, the calculation using Expression 24 is performed for each of the pixel components corresponding to the color space.

The process expressed by using Expression 24 is described in a non-patent document, P. Perez; M. Gangnet; A. Blake, Poisson image editing, Proc. SIGGRAPH, 2003, 22 (3), pp. 313-318.

Other Embodiments

The exemplary embodiment of the present invention is described above. The technical scope of the present invention is not limited to the scope described in the above-described embodiment. It is clear from the scope of claims that embodiments obtained by adding various changes and improvements to the above-described embodiment are also encompassed in the technical scope of the present invention.

What is claimed is:

1. An image processing apparatus comprising:
   at least one hardware processor configured to implement:
   a correcting unit that corrects a dynamic range of a second image in accordance with pixel information of a region in a first image; and
   a pasting unit that pastes the second image on the first image after the correction of the dynamic range, the second image having pixel information, the pixel information being corrected in such a manner that a boundary with the first image is inconspicuously viewed.

2. The image processing apparatus according to claim 1, wherein the pasting unit corrects the pixel information of the second image in such a manner that the second image after the correction of the dynamic range is in smooth contact with the first image.

3. The image processing apparatus according to claim 2, wherein the pasting unit corrects the pixel information of the second image in accordance with a distance from a boundary region between the first image and the second image to each pixel included in the second image.

4. The image processing apparatus according to claim 2, wherein the pasting unit corrects pixel information of a region of the first image, the region being a region on which the second image is pasted, the correction being performed in such a manner that, in a state in which pixel information of the first image matches pixel information of the second image in a boundary region between the first image and the second image, gradient information between each pixel included in the second image and nearby pixels is preserved.

5. The image processing apparatus according to claim 1, wherein the correcting unit determines a correction amount of the dynamic range in accordance with a difference between pixel information of an outer edge region of the second image before pasting and pixel information of the region that is to be in contact with the second image.

6. The image processing apparatus according to claim 5, wherein, in response to a determination that a compression amount of the dynamic range of the second image is larger than a predetermined value, the correcting unit also compresses a dynamic range of the first image.

7. A non-transitory computer readable medium storing a program causing a computer to execute a process comprising:
   correcting a dynamic range of a second image in accordance with pixel information of a region; and
   pasting the second image on the first image after the correction of the dynamic range, the second image having pixel information, the pixel information being corrected in such a manner that a boundary with the first image is inconspicuously viewed.

8. The image processing apparatus according to claim 1, wherein the pasting unit corrects the pixel information of the second image in accordance with a distance from a boundary region between the first image and the second image to each pixel included in the second image.

9. The image processing apparatus according to claim 1, wherein the pasting unit corrects pixel information of a region of the first image, the region being a region on which the second image is pasted, the correction being performed in such a manner that, in a state in which pixel information of the first image matches pixel information of the second image in a boundary region between the first image and the second image, gradient information between each pixel included in the second image and nearby pixels is preserved.

10. The image processing apparatus according to claim 1, wherein, in response to a determination that a compression amount of the dynamic range of the second image is larger than a predetermined value, the correcting unit also compresses a dynamic range of the first image.

* * * * *